3,043,780
DETERGENT COMPOSITION CONTAINING A 3.5-DIAMINOPYRAZINE-2.6-DICARBOXYLIC ACID DERIVATIVE
Anthony Fenwick Daglish, Cheadle Hulme, England, Rodolphe Vonderwahl, Riehen, near Basel, Switzerland, and George Arnold Tillotson, Hale, England, assignors to J. R. Geigy A.-G., Basel, Switzerland
No Drawing. Filed May 23, 1958, Ser. No. 737,215
Claims priority, application Switzerland May 29, 1957
9 Claims. (Cl. 252—117)

The present invention concerns capillary active dispersing and cleansing agents which are characterised by a content of 3.5-bis-(sec. amino)-pyrazine-2.6-dicarboxylic acid amides.

Up to now only a few processes are known for the production of 3.2;5.6-bis[(2'.4'-dioxo-1'.2'.3'.4'-tetrahydro)-1'.4'-pyrimidino]-pyrazines which have been given the common name of bis-alloxazines. According to the literature these processes only give poor yields because of the side reactions which occur and because of the often troublesome purification of the crude products due to these side reactions. Thus for example, Bredereck et al. (Berichte der deutschen chemischen Gesellschaft, vol 86, page 845 (1953) disclose yields of at most 45% of the theoretical for the condensation of 2 molecules of 1.3-dimethyl-4.5-diamino-uracil in mineral acid solution while splitting off ammonium salt, or in vol. 87, page 1268 (1954), give the same yields for the condensation of one molecule of 1.3-dimethyl-4.5-diamino-uracil with one molecule of 1.3-dimethyl-alloxan. Also Timmis in U.S. Patent No. 2,581,889 mentions yields of up to 63% of crude 3.2;5.6-bis-[(1'.3'-dimethyl-2'.4'-dioxo-1'.2'.3'.4'-tetrahydro)-1'.4'-pyrimidino]-pyrazine (also called 1.3.1'.3'-tetramethyl-bis-alloxazine) for the condensation of one molecule of 1.3-dimethyl-4-amino-5-nitroso-uracil with one mol of 1.3-dimethyl barbituric acid.

It has now been found that very good yields of 3.5-diamino-pyrazine-2.6-dicarboxylic acid derivatives are obtained if one mol of 1.3-disubstituted 4-amino-uracil is condensed with 1 mol of 1.3-disubstituted 4-amino-5-nitroso-uracil while splitting off one mol of water and one mol of ammonia to form the corresponding 3.2;5.6-bis-[(2'.4' - dioxo - 1'.2'.3'.4' - tetrahydro)-1'.4'-pyrimidino]-pyrazine and this compound is saponified by known methods either direct or in steps to form derivatives of 3.5-diaminopyrazine-2.6-dicarboxylic acid, if desired while modifying free carboxylic groups by amidation.

The 1.3-disubstituted 4-amino- or 4-amino-4-nitroso-uracils used according to the said process can be symmetrically or unsymmetrically substituted at the nitrogen atom. As nitrogen substituents both hydrocarbon radicals and also substituted hydrocarbon radicals of the aliphatic, araliphatic, alicyclic, or aromatic series are used, for example, methyl, ethyl, n-propyl, isopropyl, n-butyl, hydroxyethyl, methoxyethyl, ethoxyethyl, γ-methoxypropyl, benzyl, chlorobenzyl, methylbenzyl, cyclohexyl, methyl-cyclohexyl, phenyl, methylphenyl, chlorophenyl, methoxyphenyl groups and starting materials having the same or different substituents at the nitrogen atom can be condensed.

Saponification of 3.2;5.6-bis - [(2'.4' - dioxo-1'.2'.3'.4'-tetrahydro)-1'.4'-pyrimidino]-pyrazines in aqueous, alcoholic or organic/aqueous solution or suspension, with alkalies such as sodium or potassium hydroxide, leads to corresponding 3.5 - bis - (sec. amino)-pyrazine-2.6-dicarboxylic acid amides. Under more vigorous conditions, for example in ethanolic potassium hydroxide, the 3.5-bis-(sec. amino)-pyrazine-2.6-dicarboxylic acid monoamides are formed. In these compounds the free carboxyl group can be converted with thionyl chloride into the carboxylic acid halide group. Aminolysis of this group leads to the acid amides. A technically particularly simple method of performing the amidation consists in dissolving the carboxylic acid and the amine to be introduced in a strong tertiary nitrogen base such as pyridine, homologous pyridines or triethylamines and then stirring in gradually the necessary amount of thionyl chloride or phosphorus trichloride or bromide in the cold. After removal of the nitrogen base by dilution with water or steam, the 3.5-diaminopyrazine-2.6-dicarboxylic acid diamide is obtained direct. The free carbonyl group, which may be in the form of its salts, can also be esterified, for example on treating with dialkyl sulphates.

Other derivatives can be obtained in the aminolysis of the acid chloride group by using amines which contain different substituents from those originally at the nitrogen atom which was linked to the carbonyl group. In this way, in particular also aromatic and heterocyclic amine radicals can be introduced, for example phenylamino, methylphenylamino, chlorophenylamino, methoxyphenylamino, pyridyl-(2)-amino and morpholino groups. However, it is also possible to introduce hydroxy-alkylamino groups in this way, for example the monoethanolamide, diethanolamide, 2-hydroxypropylamide group, also aminoalkyl carboxylic acid, carboxylic acid ester and carboxylic acid amide groups. Even urea and substituted urea groups, e.g. the monophenyl urea group can be introduced in this way.

However, also unsymmetrical amidated end products can be obtained by aminolysis of 3.2;5.6-bis-[(2'.4'-dioxo-1'.2'.3'.4' - tetrahydro) - pyrimidino-1'.4']-pyrazines at a higher temperature with amines such as e.g. benzylamine, whereby only one dioxo-tetrahydro-pyrimidino ring is split, and then further hydrolysing with alkalies.

There are, thus, several methods by which it is possible to vary at will the substitution of the diaminopyrazine dicarboxylic acid amides according to the desired intended use.

The following sequence illustrates the reactions described:

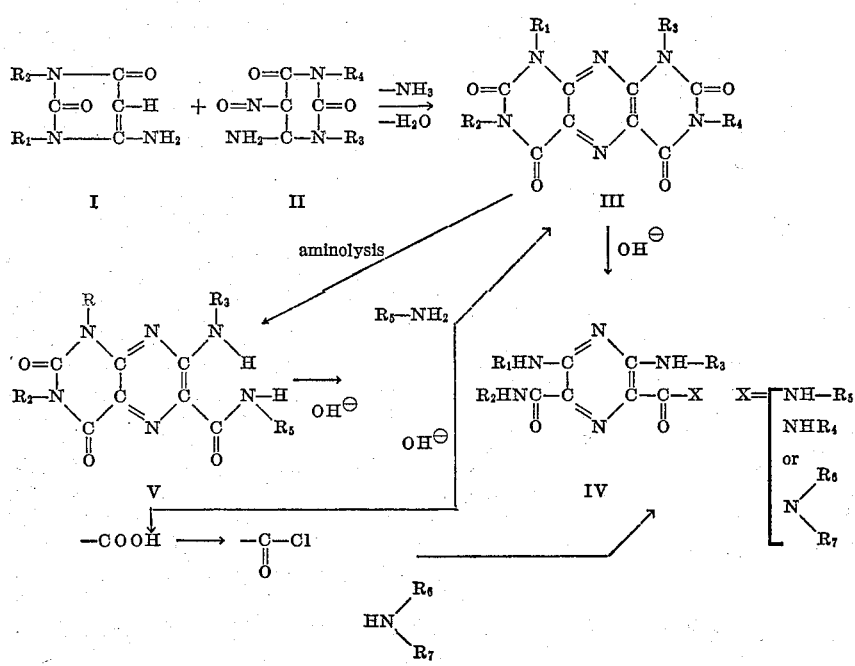

The derivatives of the 3.5-diaminopyrazine-2.6-dicarboxylic acid fluoresce in UV-containing light more or less strongly depending on their composition. The 3.5-bis-(sec. amino)-pyrazine-2.6-dicarboxylic acid amides of the general Formula IV, wherein X represents an amide radical, in particular the radical of a primary amine are particularly valuable because of their violet-blue, blue to green-blue fluorescence.

In the above sequence of reactions, $R_1$, $R_2$, $R_3$, $R_4$, $R_5$, $R_6$ and $R_7$ can represent the same or different organic radicals which have no dyestuff character; $R_6$ and $R_7$ can represent in addition, hydrogen.

$R_1$, $R_2$, $R_3$, $R_4$ represent preferably aliphatic radicals such as alkyl and substituted alkyl groups, for example methyl, ethyl, n-propyl, n-butyl, hydroxyethyl, $\beta$-hydroxypropyl, methoxyethyl, ethoxyethyl groups, however, they may also represent aralkyl and substituted aralkyl groups such as benzyl, methylbenzyl, chlorobenzyl, methoxybenzyl groups or cycloaliphatic radicals such as cyclohexyl, methyl-cyclohexyl groups. $R_6$ and $R_7$ can be hydrogen or the same as $R_1$, in addition $R_7$ can also be a heterocyclic radical, for example the 2-pyridyl radical or a divalent radical linking two pyrazine radicals, for example an alkylene or a diphenyl alkane radical; it can also represent a carbamyl radical, for example the phenyl carbamyl radical and thus X can also represent a urea radical or a ureido radical which may possibly be organically substituted. $R_6$ and $R_7$ together with the carbamide-N-atom can also represent a heterocyclic radical, for example a piperidino or a morpholino group.

An important application of the present invention is for the improvement of the appearance of textile fibres at any stage of processing by treating them with aqueous liquors which contain emulsifying, capillary active substances in addition to the 3.5-diaminopyrazine-2.6-dicarboxylic acid amides. In particularly valuable compositions according to the present invention, the emulsifying agents also have cleansing properties. The capillary active substances can be used as such, or mixed with each other and also admixed with the usual additives (builders). Both the usual water soluble soaps and also synthetic, organic non-soap anion-active sulphated detergents can be used as cleansing agents. These washing agents can contain substances from the following classes for example:

A. ANION ACTIVE SUBSTANCES (1) Sodium, potassium and alkanol amine salts of higher fatty acids containing 8 to 18 carbon atoms in the hydrocarbon radical;

(2) Alkali metal and ammonium salts of monosulphuric acid esters of: fatty alcohols having 10 to 30 carbon atoms, glycerine monoesters of fatty acids having 8 to 18 carbon atoms, oxalkyl ethers of fatty alcohols and alkyl phenols having lipophilic hydrocarbon radicals, fatty acid alkanol amides having lipophilic hydrocarbon radicals, polyglycol ethers of fatty alcohols having 10 to 30 carbon atoms;

(3) Alkali metal and ammonium salts of sulphonic acids from: paraffines (mersolates), alkylbenzenes and naphthols (dodecyl benzene sulphonates, isobutyl naphthol sulphonates, methyl dinaphthyl sulphonates), benzimidazols having a higher alkyl or alkenyl radical in the 2-position, N-phenyl-1.3.5-triazines having a lipophilic hydrocarbon radical of 12 to 18 carbon atoms, succinic acid esters of alkanols having 6 to 12 carbon atoms;

(4) Amide-like condensation products of higher fatty acids with: isethionic acid (Igepon A), taurine and N-methyl taurine (Igepon T).

B. NON-IONOGENIC SUBSTANCES (1) Polyglycol ethers of higher alkanols and higher fatty acids as well as of alkyl phenols having lipophilic hydrocarbon radicals;

(2) Polyglycol ethers of alkanol amides of higher fatty acids.

The following substances can be added either individually or combined to the washing agents mentioned above: The sodium or potassium salts of sulphuric acid, hydrochloric acid, carbonic acid, boric acid, silicic acids, phosphoric acids including those which, as ortho-phosphoric acids, have less water content; in addition, alkali metal perborates, percarbonate, persulphate; magnesium salts of meta-silicic acid; cellulose methyl or ethyl ethers, alkali metal salts of carboxymethyl cellulose (CMC), of ethylene diamine tetra-acetic acid and similar N-polyacetic acids which form complexes.

The 3.5-bis-(sec. amino)-pyrazine-2.6-dicarboxylic acid amides can be mixed with the aqueous washing liquors or with the washing and cleansing agents used in the production thereof. Particularly valuable are detergent compositions consisting essentially of water soluble, synthetic, organic anion active detergents selected from the group consisting of water soluble soaps and synthetic organic non-soap anion active sulphated detergents containing 0.001 to 5% by weight of a 3.5-diaminopyrazine-2.6-dicarboxylic acid amide of the general formula:

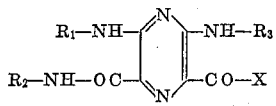

wherein each of $R_1$, $R_2$ and $R_3$ represents a member selected from the group consisting of lower alkyl- and phenyl-substituted methyl radicals and X represents an amino group. X can be primary amino or the radical of an organic primary or secondary amine. In the most valuable and therefore preferred compounds, X is the radical of a primary amine of the aliphatic, phenyl-substituted lower aliphatic, alicyclic, mononuclear isocyclic-aromatic and heterocyclic series.

In the washing and cleansing agents according to the present invention which are intended for the treatment of textiles, the content of 3.5-bis-(sec. amino)-pyrazine-2.6-dicarboxylic acid amides is advantageously 0.01 to 5%, calculated on the weight of the composition. On the other hand, if it is only desired to attain an improved appearance of the washing and cleansing agent itself, then a content of 0.001 to 0.5% is sufficient. Thus washing and cleansing agents according to the present invention are characterised by contents of 0.001 to 5% of 3.5-bis-(sec. amino)-pyrazine-2.6-dicarboxylic acid amide. These optical brightening agents can be incorporated in the washing and cleansing agents either alone or together with other optical brightening agents. Particularly, in all round textile washing agents for household use, the 3.5 - bis - (sec. amino) - pyrazine - 2.6 - dicarboxylic acid amides which are effective for certain more hydrophobic fibres or parts thereof such as acyl cellulose, polyamide and polyurethane fibers, as well as for wool and silk, can be complemented by optical brightening agents which have affinity to cellulose fibres.

The following examples illustrate the invention. Where not otherwise stated, parts are given as parts by weight. The temperatures are in degrees centigrade. The relationship of parts by weight to parts by volume is as that of kilogrammes to litres.

*Example 1*

3.5 - bis - ethylaminopyrazine-2.6-dicarboxylic acid-bis-ethylamide of the formula:

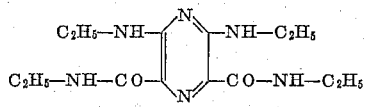

212 parts of 1.3-diethyl-4-amino-5-nitroso-uracil and 183 parts of 1.3-diethyl-4-amino-uracil are dissolved in 750 parts of glacial acetic acid and the solution is refluxed for 3 hours while stirring. The grey-greenish solution is cooled, the precipitate formed is filtered off under suction, washed well with water and dried. 320 parts of 3.2;5.6 - bis - [(1'.3' - diethyl - 2'.4' - dioxo - 1'.2'.3'.4'-tetrahydro)-1'.4'-pyrimidino]-pyrazine are obtained as white crystals which melt at 233.5–234.5°. This corresponds to a yield of 89% of the theoretical calculated on the 1.3-diethyl-4-amino-5-nitrosouracil used. An analytically pure preparation recrystallised from 75% acetic acid which melts at 235.5–236° has the following elementary analysis.

Calculated for $C_{16}H_{20}O_4N_6$: C=53.32%; H=5.59%; N=23.32%. Found: C=53.17%; H=5.61%; N=23.11%.

To saponify the 3.2;5.6-bis-[(1'.3'-diethyl-2'.4'-dioxo-1'.2'.3'.4'-tetrahydro)-1'.4'-pyrimidino]-pyrazine, 10 parts are refluxed for 2½ hours with 300 parts by volume of 1 N-caustic soda lye and 200 parts of ethanol. The precipitate which crystallises out on cooling is filtered off under suction, well washed and dried. 7.5 parts of 3.5-bis - ethylamino-pyrazine-2.6-dicarboxylic acid-bis-ethylamide (M.P. 133–134°) are obtained. An analytically pure preparation recrystallised from ethanol, has the same melting point and the following elementary analysis.

Calculated for $C_{14}H_{24}O_2N_6$: C=54.52%; H=7.84%; N=27.25%. Found: C=54.63%; H=8.00%; N=27.21%.

On using the corresponding amounts of 1.3-dipropyl-, 1.3-dibutyl- and 1.3-dimethyl-4-amino-uracil and of 1.3-dipropyl, 1.3-dibutyl- and 1.3-dimethyl-4-amino-5-nitroso-uracil, the following 3.2;5.6-bis-[(1'.3'-dialkyl-2'.4'-dioxo-1'.2'.3'.4'-tetrahydro)-1'.4'-pyrimidino]-pyrazines are obtained in a similar manner:

| Alkyl | M.P., °C. | Elementary analysis, percent | | | | | |
|---|---|---|---|---|---|---|---|
| | | C cal'd | C found | H cal'd | H found | N cal'd | N found |
| n-$C_3H_7$ | 150–151 | 55.66 | 55.70 | 6.23 | 6.52 | | |
| n-$C_4H_9$ | 115–116 | 60.59 | 60.32 | 7.93 | 7.62 | 16.96 | 17.19 |
| $CH_3$ | 390 | 47.4 | 47.4 | 3.95 | 4.17 | 27.6 | 27.8 |

By saponifying these according to paragraph 2 of the example, the corresponding 3.5-bis-alkylaminopyrazine-2.6-dicarboxylic acid-bis-alkylamides are obtained:

| Alkyl | M.P., °C. | Elementary analysis, percent | | | | | |
|---|---|---|---|---|---|---|---|
| | | C cal'd | C found | H cal'd | H found | N cal'd | N found |
| n-$C_3H_7$ | 96–97 | 59.31 | 59.43 | 8.85 | 8.91 | | |
| n-$C_4H_9$ | 89–91 | (¹) | (¹) | (¹) | (¹) | (¹) | (¹) |
| $CH_3$ | 232–233 | 47.6 | 47.8 | 6.35 | 6.04 | 33.3 | 33.5 |

¹ The crystals contain crystal solvent.

All these 3.5-bis-alkylaminopyrazine-2.6-dicarboxylic acid-bis-alkylamides have a strong to very strong violet-blue fluorescence depending on their composition.

*Example 2*

3-propylamino-5-ethylamino-pyrazine-2-carboxylic acid propylamide-6-carboxylic acid ethylamide of the formula:

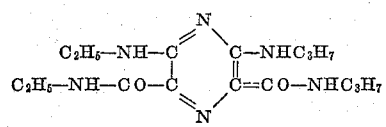

42 parts of 1.3-diethyl-4-amino-5-nitroso-uracil and 42 parts of 1.3-dipropyl-4-amino-uracil are dissolved in 150 parts of glacial acetic acid and the solution is refluxed for 3 hours while stirring. The pale brownish solution is cooled and diluted with water. The precipitate formed is filtered off under suction, washed well with water and dried. 70 parts of 3.2-[(1'.3'-diethyl-2'.4'-dioxo-1'.2'.3'.4'-tetrahydro) - 1'.4' - pyrimidino] - 5.6 - [(1'.3' - dipropyl-2'.4' - dioxo - 1'.2'.3'.4' - tetrahydro) - 1'.4' - pyrimidino]-pyrazine are obtained in the form of white crystals which melt at 147.5–149°. This corresponds to a yield of 90% of the theoretical, calculated on the 1.3-diethyl-4-amino-5-nitroso-uracil used. An analytically pure product recrystallised from ethanol melts at 150–151° and has the following elementary analysis.

Calculated for $C_{18}H_{24}N_6O_4$: C=55.66%; H=6.23%. Found: C=55.70%; H=6.52%.

To saponify the 3.2-[(1'.3'-diethyl-2'.4'-dioxo-1'.2'.3'.4'-tetrahydro) - 1'.4' - pyrimidino] - 5.6 - [(1'.3' - dipropyl- 2'.4' - dioxo - 1'.2'.3'.4' - tetrahydro) - 1'.4' - pyrimidino]-pyrazine, 10 parts are refluxed for 2½ hours with 300 parts by volume of 1 N-caustic soda lye and 200 parts of ethanol. The reaction mixture is cooled and then neutralised with diluted hydrochloric acid. The precipitate formed is filtered off under suction, washed and dried. 7.2 parts of 3 - propylamino - 5 - ethylamino - pyrazine - 2.6 - dicarboxylic acid-2-propylamide-6-ethylamide are obtained. M.P. 91–92°.

An analytically pure preparation recrystallised from ethanol has the following elementary analysis.

Calculated for $C_{16}H_{28}N_6O_2$: C=57.12%; H=8.39%; N=24.98%. Found: C=57.14%; H=8.45%; N=24.91%.

On condensing 4-amino-uracils with 4-amino-5-nitroso-uracils which are differently alkyl substituted at the ring nitrogen atom, for example by using corresponding amounts of 1.3-dimethyl-, 1.3-diethyl- and 1.3-dipropyl-4-amino-uracils and 1.3-dimethyl-, 1.3-diethyl- and 1.3-dipropyl-4-amino-5-nitroso-uracils, the following unsymmetrical 3.2;5.6-[(1'.3'-dialkyl-2.4'-dioxo-1'.2'.3'.4'.-tetrahydro)-1'.4'-pyrimidino]-pyrazines are obtained in the same way:

| 1. Alkyl $R_1$ and $R_2$ | 2. Alkyl $R_3$ and $R_4$ | M.P., °C. | Elementary analysis, percent | | | | | |
|---|---|---|---|---|---|---|---|---|
| | | | C cal'd | C found | H cal'd | H found | N cal'd | N found |
| —CH₃ | n-C₃H₇ | 169–163.5 | 53.32 | 53.36 | 5.59 | 5.57 | 23.32 | 23.24 |
| CH₃ | C₂H₅ | 253–254 | 50.60 | 50.61 | 4.85 | 4.72 | | |

On saponifying these according to paragraph 2 of the above example, the corresponding unsymmetrical 1.3-bis-alkylamino-pyrazine-2.6-dicarboxylic acid-bis-alkylamides are obtained:

| 1. Alkyl $R_1$ and $R_2$ | 2. Alkyl $R_3$ and $R_4$ | M.P., °C. | Elementary analysis, percent | | | | | |
|---|---|---|---|---|---|---|---|---|
| | | | C cal'd | C found | H cal'd | H found | N cal'd | N found |
| CH₃— | n-C₃H₇ | 136–137 | 54.52 | 54.64 | 7.84 | 8.02 | 27.25 | 26.98 |
| CH₃— | C₂H₅— | 169–170 | 51.41 | 51.66 | 7.19 | 7.17 | 29.98 | 29.95 |

All these unsymmetrical 3.5-bis-alkylamino-pyrazine-2.6-dicarboxylic acid-bis-alkylamides have a strong to very strong violet-blue fluorescence depending on their composition. Due to this property, they can be used for the brightening of natural and synthetic polypeptides as follows:

(a) *Synthetic polypeptides.*—50 parts of pale yellowish nylon fabric are washed for 30 minutes at 70° in 2500 parts of a washing liquor containing 6.3 parts of an alkylaryl sulphonate of the marketed name "Santomerse No. 1" and 0.005 part of 3-propylamino-5-methylamino-pyrazine-2-carboxylic acid-propylamide-6-carboxylic acid methylamide. The fabric is then rinsed and dried in the air. The fibres so treated have a much more white appearance in daylight than untreated goods.

The 3-methylamino-5-ethylamino-pyrazine-2-carboxylic acid-methylamide-6-carboxylic acid ethylamide and 3-propylamino-5-ethylamino-2 - carboxylic acid - propylamide-6-carboxylic acid ethylamide described in the above example can be used in the same way with similar success.

(b) *Wool.*—100 parts of previously bleached wool flannel are washed for half an hour at 55° in 2000 parts of a washing liquor containing 5 parts of an alkylaryl sulphonate of the marketed name "Santomerse No. 1" and 0.05 part of 3-propylamino-5-ethylamino-pyrazine-2-carboxylic acid-propylamide-6-carboxylic acid - ethylamide. The wool is then rinsed and dried in the air. In this way wool of a considerably more white appearance is obtained than when the wool is washed without the addition of the brightening agent.

The 3-propylamino-5-methylamino-pyrazine-2 - carboxylic acid-propylamide-6-carboxylic acid methylamide and 3-methylamino-5-ethylamino-pyrazine-2 - carboxylic acid methylamide-6-carboxylic acid ethylamide described in the above example can be used in the same way with the same success instead of the brightening agent mentioned.

*Example 3*

3.5-bis-methylamino-pyrazine-2-carboxylic acid-phenylamide-6-carboxylic acid methylamide of the formula:

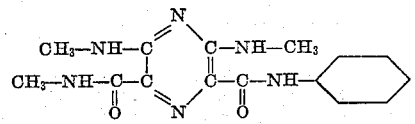

31 parts of 1.3-dimethyl-4-amino-uracil and 40 parts of 1.3-dimethyl-4-amino-5-nitroso-uracil are refluxed while stirring for 3 hours in 200 parts of glacial acetic acid. The reaction mixture is cooled, the precipitate formed is filtered off under suction, washed well with water and dried. 51 parts of 3.2;5.6-bis-[(1'.3'-dimethyl-2'.4'-dioxo-1'.2'.3'.4'-tetrahydro)-1'.4'-pyrimidino]-pyrazine are obtained in the form of white crystals which melt at 390° (the melting point depends on the heating time). This corresponds to a yield of 84% of the theoretical, calculated on the 1.3-dimethyl-4-amino-uracil used. Recrystallized from 75% acetic acid, an analytically pure preparation has the following elementary analysis.

Calculated for $C_{12}H_{12}O_4N_6$: C=47.4%; H=4.17%; N=27.8%. Found: C=47.4%; H=3.95%; N=27.6%.

To saponify the 3.2;5.6-bis-[(1'.3'-dimethyl-2'.4'-dioxo-1'.2'.3'.4'-tetrahydro)-1'.4'-pyrimidino] - pyrazine, 152 parts are refluxed for 6 hours with a solution consisting of 200 parts of potassium hydroxide and 2400 parts of ethanol. 117 parts of 3.5-bis-methylamino-2 - carboxy-pyrazine-6-carboxylic acid methylamide (M.P. 214°, decomposition dependent on the heating time) are obtained. Recrystallized from ethanol, an analytically pure preparation has the following elementary analysis.

Calculated for $C_9H_{13}O_3N_5 + \frac{1}{2}H_2O$: C=43.48%; H=5.68%; N=28.3%. Found: C=43.59%; H=5.50%; N=28.45%.

To amidate the 3.5-bis-methylamino-2-carboxypyrazine-6-carboxylic acid methylamide 20 parts are mixed with 150 parts of thionyl chloride. The mixture is left to stand for 45 minutes and then the excess thionyl chloride is removed in the vacuum. The remaining crystalline acid chloride is then slowly added to a solution of 10 parts of aniline and 400 parts of abs. pyridine, which solution is cooled with a mixture of ice/sodium chloride and stirred overnight. The pyridine is then removed by steam distillation, the residue is filtered off under suction and washed well with water. Pale yellow crystals of 3.5-bis-methylamino-pyrazine-2-carboxylic acid phenylamide-6-carboxylic acid methylamide are obtained which melt at 195–197°.

Recrystallised from ethanol, an analytically pure preparation melts at 198–198.5° and has the following elementary analysis.

Calculated for $C_{15}H_{18}O_2N_6$: C=57.31%; N=5.77%; N=26.74%. Found: C=57.42%; N=6.01%; N=26.86%.

Amidation of 3.5-bis-methylamino-2-carboxy-pyrazine-6-carboxylic acid methylamide in pyridine or in an aqueous medium according to paragraph 3 of this example with the amines corresponding to R in the following table, produces the following compounds:

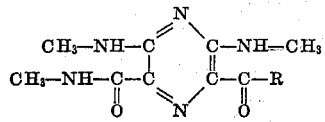

| No. | R | M.P.,¹ ° C. | Colour of fluorescence |
|---|---|---|---|
| 1 | —NH₂ | 290 –292 | Violet-blue. |
| 2 | —NH—CH₂—CH₂OH | 210 –210.5 | Do. |
| 3 | —NH—CH₂—CH₂—CH₃ | 218 –219 | Do. |
| 4 | —NH—CH₂—CH₃ | 197 –198.5 | Do. |
| 5 | —NH—CH₂—⟨phenyl⟩ | 218.5–220 | Blue-violet. |
| 6 | —NH—CH₂—CH₂—⟨phenyl⟩ | 76 – 78 | Do. |
| 7 | —NH—⟨phenyl⟩—OCH₃ | 126.5–127 | Blue. |
| 8 | —NH—CH₂—CH₂—CH₂—CH₃ | 194 –196 | Violet-blue. |
| 9 | —NH—⟨phenyl⟩—O—⟨phenyl⟩ | 252 –254 | Blue. |
| 10 | —NH—CH₂—CH=CH₂ | 194 –195.5 | Violet-blue. |
| 11 | —NH—(CH₂)₇—CH₃ | 121 –121.5 | Do. |
| 12 | —NH—CH(CH₂—CH₂)(CH₂—CH₂)CH₂ (cyclopentyl) | 237 –238 | Blue-violet. |
| 13 | —N(CH₃)(CH₃) | 128 –129 | Violet. |
| 14 | —NH—CH(CH₂—CH₃)(CH₃) | 188 –190 | Violet-blue. |
| 15 | —NH—C(H—C—C—H)(N=C—H)C—H (pyrimidinyl) | 223 –224 | Blue-violet. |
| 16 | —NH—C(CH₃)(CH₃)CH₃ | 204 –205 | Violet-blue. |
| 17 | —NH—⟨phenyl⟩—CH₃ | 211 –212.5 | Blue-violet. |
| 18 | —NH—⟨phenyl(CH₃)⟩ | 194 –195 | Do. |
| 19 | —NH—⟨phenyl(CH₃)⟩ | 172 –173 | Do. |
| 20 | —NH—⟨phenyl⟩—Cl | 261 –262.5 | Do. |
| 21 | —NH—⟨phenyl(Cl)⟩ | 186 –187 | Do. |

See footnote at end of table.

| No. | R | M.P.,[1] °C. | Colour of fluorescence |
|---|---|---|---|
| 22 | —NH—C₆H₃(Cl)(Cl) (2,4-dichlorophenyl) | 216–217 | Violet-blue. |
| 23 | —NH—C₆H₄—COOH | 268–270 | Do. |
| 24 | —NH—C₆H₄—SO₃H | ------------ | Do. |
| 25 | —NH—C₆H₄—SO₃H | ------------ | Do. |
| 26 | —NH—C₆H₄—NH—SO₂—C₆H₄—CH₃ | 226–227 | Do. |
| 27 | —NH—C₆H₄—SO₂NH₂ | 234–236 | Do. |
| 28 | —N(CH₂—CH₂)₂O (morpholino) | 155–156 | Do. |
| 29 | —NH—CH(CH₃)₂ | 175–177 | Do. |
| 30 | —NH—CH₂—CH₂—CH₂OH | 147–149 | Do. |
| 31 | —NH—C(CH=CH—CH=N—CH) (pyridyl) | 209–211 | Blue-violet. |
| 32 | —HN—C(=N—N(C₆H₅)—C(CH₃)=CH) (1-phenyl-3-methylpyrazolyl) | 267–269 | Do. |
| 33 | —HN—C(=N—CH=CH—S) (thiazolyl) | 234–236 | Do. |
| 34 | —HN—C(=N—N=C(CH₃)—S) (methylthiadiazolyl) | 262–263 | Do. |
| 35 | —HN—C(=CH—CH=N(C₆H₅)—N) (1-phenylpyrazolyl) | 236–238 | Do. |
| 36 | —HN—(quinolyl) | 232–234 | Do. |

[1] The melting points depend greatly on the heating time.

If, in the process according to paragraph 3 of the above example, ureas are reacted in pyridine with the 3.5-bis-methylamino-2-carboxypyrazine-6-carboxylic acid methylamide, then the following compounds are obtained:

| No. | R | M.P.¹ °C. | Colour of fluorescence |
|---|---|---|---|
| 37 | —NH—C(=O)—NH—C₆H₅ | 233–234 | Blue. |
| 38 | —NH—C(=O)—NH—CH₂—C₆H₅ | 190–191 | Violet-blue. |
| 39 | —NH—C(=O)—NH—CH₃ | 215–217 | Do. |

¹ The melting points depend greatly on the heating time.

On using corresponding amines of 1.3-dibenzyl- and 1.3-diethyl-4-amino-uracils and 1.3-dibenzyl- and 1.3-diethyl-4-amino-5-nitroso-uracils, the 3.2;5.6-bis-[(1'.3'-dibenzyl-2'.4'-dioxo-1'.2'.3'.4'-tetrahydro) - 1'.4' - pyrimidino]-pyrazines and 3.2;5.6-bis-[(1'.3'-diethyl-2'.4'-dioxo-1'.2'.3'.4'-tetrahydro)-1'.4'-pyrimidino]-pyrazines are obtained in the same manner. On saponifying these according to paragraph 2 of this example, the corresponding 3.5-bis-substituted aminopyrazine-2-carboxylic acid-6-carboxylic acid benzyl- or ethyl-amides are obtained.

| Substituent R₁, R₂ and R₃ | M.P., °C. | Elementary analysis in percent | | | | | |
|---|---|---|---|---|---|---|---|
| | | C cal'd | C found | H cal'd | H found | N cal'd | N found |
| —CH₂—C₆H₅ | 161–162 | 69.36 | 69.30 | 5.39 | 5.36 | 14.98 | 15.06 |
| —C₂H₅ | 174–175 | 51.23 | 51.32 | 6.81 | 7.02 | 24.90 | 25.08 |

By amidation in pyridine according to paragraph 3 of this example, the corresponding 3.5-bis-ethyl- or -benzyl-aminopyrazine-2-carboxylic acid ethyl- or benzyl-amide-6-carboxylic acid amides are obtained, for example:

| No. | Substituent R₁, R₂ and R₃ | X | M.P., °C. | Elementary analysis in percent | | | | | |
|---|---|---|---|---|---|---|---|---|---|
| | | | | C cal'd | C found | H cal'd | H found | N cal'd | N found |
| 40 | C₂H₅ | —NH—C₆H₅ | 146.5–147.5 | 60.65 | 60.77 | 6.79 | 7.07 | 23.58 | 23.55 |
| 41 | C₂H₅ | —NH—C(=N—CH=CH—N=CH—) (pyrimidinyl) | 108–109 | 56.9 | 56.6 | 6.7 | 6.7 | 26.6 | 26.6 |

Because of their fluorescence and their drawing power, the compounds listed in the examples and the tables can be used with success for the brightening of textile fibres as follows:

(a) *Synthetic polypeptides.*—50 parts of undyed nylon are washed at 70° for half an hour in a washing liquor (liquor ratio 1:20) containing 0.03 part of 3.5-bis-methyl-amino - pyrazine-2-carboxylic acid - [3' - methoxyphenyl-amide]-6-carboxylic acid methylamide and 8 parts of dodecyl benzene sulphonate, and then rinsed and dried. The nylon so treated has a much more brilliant appearance in daylight than material washed without the addition of brightening agent. Instead of dodecyl benzene sulphonate, also other synthetic washing and cleansing agents such as, for example, fatty alcohol sulphates or oleoyl tauric acid alkali salts etc. can be used.

The following compounds described in the above tables can be used in the same manner with similar success instead of the brightening agents mentioned: Nos. 1, 2, 3, 4, 5, 6, 8, 10, 11, 12, 14, 15, 16, 19, 20, 21, 22, 23, 24, 25, 26, 27, 29, 30, 31, 33, 34, 36, 38, 39, 40 and 41.

(b) *Wool.*—50 parts of previously bleached wool flannel are treated for 1 hour at 50–55° in a dyebath (liquor ratio 1:20) containing 3 parts of sodium hydrosulphite and 1 part of sodium pyrophosphate and also 0.05 part of 3.5-bis-methylamino-pyrazine-2-carboxylic acid phenylamide-6-carboxylic acid methylamide. After rinsing and drying, the wool flannel has a considerably more white appearance than material treated without the addition of brightening agents.

The following compounds in the above tables can be used in the same manner with the same success: Nos. 1, 2, 3, 4, 5, 6, 7, 8, 10, 11, 12, 14, 15, 16, 18, 19, 21, 22, 23, 24, 25, 27, 29, 30, 31, 39, 40 and 41.

(c) *Pure silk.*—10 parts of pale yellowish pure silk are washed at 55° for 30 minutes in 200 parts of a washing liquor containing 0.5 part of an alkylaryl sulphonate of the marketed name "Santomerse No. 1" and 0.01 part of 3.5-bis-methylamino-pyrazine-2-carboxylic acid phenyl-amide-6-carboxylic acid methylamide, and then rinsed and dried in the air. In this way, pure silk of considerably more white appearance is obtained than if it had been washed without the addition of the brightening agent named.

Also very beautiful effects are obtained if instead of the brightening agent used above, the following compounds mentioned in the tables are used: Nos. 1, 2, 3, 4, 5, 7, 11, 12, 15, 27 and 31.

*Example 4*

3-methylamino-5-ethylamino-pyrazine-2-carboxylic acid amide-6-carboxylic acid ethylamide of the formula:

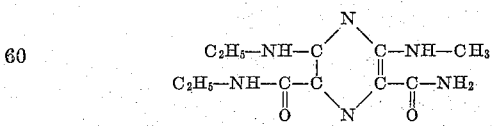

To saponify the 3.2[(1'.3'-dimethyl-2'.4'-dioxo-1'.2'.3'.4'-tetrahydro) - 1'.4'-pyrimidino] - 5.6 - [(1'.3'-diethyl-2'.4' - dioxo-1'.2'.3'.4'- - tetrahydro) - 1'.4' - pyrimidino]-pyrazine, produced for example as in Example 2, 57 parts of this compound are refluxed for 6 hours with a solution consisting of 45 parts of potassium hydroxide and 500 parts of ethanol. The ethanol is distilled off, the reaction mixture is acidified with diluted hydrochloric acid and 43 parts of 3-methylamino-5-ethylamino-pyrazine-2-carboxylic acid-6-carboxylic acid ethyl amide are isolated. The compound melts at 160–162° (the melting point depends on the heating time).

Recrystallised from methanol, an analytically pure preparation has the following elementary analysis.

Calculated for $C_{11}H_{17}O_3N_5$: C=49.43%; H=6.41%; N=26.20%. Found: C=49.99%; H=6.49%; N=26.27%.

To amidate the 3-methyamino-3-ethylamino-pyrazine-2-carboxylic acid-6-carboxylic acid ethylamide, 20 parts of this compound are mixed with 100 parts of thionyl chloride. The mixture is left to stand for 45 minutes and then excess thionyl chloride is removed in the vacuum. The acid chloride which remains is then poured into a solution of 300 parts of concentrated aqueous ammonia and 100 parts of ethanol, which solution has been cooled with a mixture of ice and sodium chloride. The whole is stirred overnight. The precipitate formed is filtered off under suction and washed well with water. 3-methyl-amino-5-ethylamino-pyrazine-2-carboxylic acid amide-6-carboxylic acid ethylamide is obtained in the form of pale yellow crystals which melt at 212–214°.

Recrystallised from ethanol, an analytically pure preparation melting at 223–234° has the following elementary analysis.

Calculated for $C_{11}H_{18}O_2N_6$: C=49.61%; H=6.81%; N=31.56%. Found: C=49.49%; H=6.90%; N=31.88%.

The following 3-methylamino-5-ethylamino-pyrazine-2-carboxylic acid alkylamide-6-carboxylic acid ethylamides for example are obtained in the same manner on amidation with other amines:

| Alkyl | M.P., ° C. | Elementary analysis in percent | | | | | |
|---|---|---|---|---|---|---|---|
| | | C cal'd | C found | H cal'd | H found | N cal'd | N found |
| —$C_2H_5$ | 162–164 | 53.04 | 53.06 | 7.53 | 7.59 | 28.55 | 28.53 |
| —$C_3H_7$ | 84–86 | 53.3 | 53.4 | 7.85 | 7.93 | 26.7 | 26.8 |
| —$CH_2$—⬡ | 87–89 | 59.6 | 59.3 | 6.86 | 6.68 | 23.2 | 23.4 |

Depending on their composition, all these 3-methyl-amino-5-ethylamino-2-carboxylic acid alkylamide-6-carboxylic acid ethylamides have a strong to very strong violet-blue fluorescence.

Example 5

0.075 part of 3.5-bis-methylamino-pyrazine-2-carboxylic acid-phenylamide-6-carboxylic acid methylamide are worked into 100 parts of soap powder consisting of the sodium salt of fatty acids with 5% water content. Nylon fabric washed at 40° in a washing liquor (liquor ratio 1:30) containing 5 parts per litre of the soap powder described above, has a much more brilliant appearance.

If, in the above washing agent, 0.09 part of 3.5-bis-methylamino-pyrazine-2.6-dicarboxylic acid methylamide are used instead of the pyrazine named, then the treated fibres also have a beautiful white appearance. If an even stronger brightening effect on acetate silk is required, then 1 to 2 parts of the brightening agent named can be used.

Example 6

0.075 part of 3.5-bis-methylamino-pyrazine-2-carboxylic acid phenylamide-6-carboxylic acid methylamide are worked into 100 parts of washing agent consisting of 55% sodium salt of lauryl alcohol sulphate, 40% sodium sulphate, 2% carboxymethyl cellulose and 3% water content.

Wool, as well as nylon and acetate silk fabric, which is washed at 40–50° in a washing liquor (liquor ratio 1:30) containing 5 parts per litre of the washing agent described above, has a beautiful white appearance.

If, instead of the pyrazine in the above anion active washing agent, 0.2 part of 3.5-bis-methylamino-pyrazine-2.6-dicarboxylic acid methylamide or 0.2 part of 3-propylamino-5-methylamino-pyrazine-2-carboxylic acid propylamide-6-carboxylic acid methylamide or 0.15 part of 3-ethylamino-5-methylamino-pyrazine-2.6-dicarboxylic acid ethylamide or 0.3 part of 3-propylamino-5-ethyl-amino-pyrazine-2-carboxylic acid propylamide-6-carboxylic acid ethylamide or 0.2 part of 3-ethylamino-5-methylamino-pyrazine-2-carboxylic acid ethylamide-6-carboxylic acid benzylamide are used, then similar effects are obtained on treating the fibres above mentioned.

Instead of the anion active washing agent described, also those consisting of salts of sulphonic acid esters of ethoxylated fatty alcohols or salts of sulphonic acid esters of alkanol amides of fatty acids can be used.

Example 7

0.05 part of 3.5-bis-methylamino-pyrazine-2-carboxylic acid phenylamide-6-carboxylic acid methylamide are worked into 100 parts of washing agent of the composition: 20% dodecyl benzene sulphonate, 15% sodium lauryl sulphonate, 2% carboxymethyl cellulose, 15% tetrapyrophosphate, 20% tripolyphosphate, 22% sodium sulphate and 6% water.

If nylon or acetate silk is washed at 60° in a washing liquor containing 6 parts per litre of the washing agent described, then the fabric has a brilliant appearance.

If, in the above washing agent instead of the pyrazine mentioned, 0.12 part of 3.5-bis-ethylamino-pyrazine-2.6-dicarboxylic acid methylamide are used, then the fibres mentioned also have a beautiful appearance.

If the washing agent contains 0.15 part of 3.5-bis-methylamino-pyrazine-2-carboxylic acid pyridylamide-6-carboxylic acid methyl amide, then wool flannel or acetate silk washed therein has a beautiful white appearance.

Example 8

0.2 part of 3.5-bis-methylamino-pyrazine-2.6-dicarboxylic acid methylamide are incorporated into 100 parts of washing agent consisting of 45% soap, 5% water glass, 10% pyrophosphate, 15% sodium carbonate, 3% magnesium meta silicate, 7% perborate and 15% water.

Nylon and acetate silk fabric which are washed at 70° in a washing liquor (liquor ratio 1:30) containing 8 parts per litre of the above washing agent have a much more white appearance than when washed without the addition of the brightening agent.

If in the above washing agent, instead of the brightening agent named, 0.06 part of 3.5-bis-methylamino-pyrazine-2-carboxylic acid pyridylamide-6-carboxylic acid methylamide or 0.04 part of 3.5-bis-methylamino-pyrazine-2-carboxylic acid phenylamide-6-carboxylic acid methylamide, are used then similar effects on the above mentioned fibres are obtained.

Example 9

0.1 part of 3.5-bis-ethylamino-pyrazine-2.6-dicarboxylic acid ethylamide are incorporated into 100 parts of washing agent of the composition: 12% dodecyl benzene sulphonate, 10% sodium lauryl sulphate, 5% water glass, 2% carboxymethyl cellulose, 15% tripolyphosphate, 20% pyrophosphate, 10% sodium carbonate, 20% sodium sulphate and 6% water.

Nylon fabric which is washed at 70° in a washing liquor (liquor ratio 1:30) containing 8 parts per litre of the washing agent described above, has a brilliant appearance.

If, in the above washing agent, instead of the pyrazine mentioned, 0.08 part of 3.5-bis-methylamino-pyrazine-2.6-dicarboxylic acid methylamide or 0.005 part of 3.5-bis-methylamino-pyrazine-2-carboxylic acid phenylamide-6-carboxylic acid methylamide are used, then a brightening effect is also obtained.

*Example 10*

0.1 part of 3.5-bis-methylamino-pyrazine-2-carboxylic acid phenylamide-6-carboxylic acid methylamide are added to 100 parts of washing agent consisting of 30% of a condensation product of oleic acid and methyl taurine, 65% sodium sulphate and 5% water.

Nylon fabric washed at 50° in a washing liquor containing 5 parts per litre of the washing agent described has a much more white appearance than fabric washed without the addition of brightening agent.

Acetate silk fabric washed under the same conditions with a washing agent of the same composition but containing 0.15 part of 3.5-bis-ethylamino-pyrazine-2.6-dicarboxylic acid ethylamide instead of the pyrazine named, also has a beautiful white appearance.

Also a washing agent consisting of the condensation product of oleic acid and taurine can be used instead of that desired.

*Example 11*

0.075 part of 3-ethylamino-5-methylamino-pyrazine-2.6-dicarboxylic acid ethylamide are incorporated into 100 parts of washing agent consisting of 25% of a sulphonated condensation product of p-methoxyphenyl diguanide and oleic acid (1-p-methoxy-phenyl-2-imino-4-amino-6-oleyl-1.3.5-triazine sulphonic acid), 70% sodium sulphate and 5% water.

Nylon fabric washed at 50° in a washing liquor (liquor ratio 1:30) which contains 5 parts per litre of the washing agent described above, has a brilliant appearance.

Wool fabric washed under the same conditions with the above washing agent but containing 0.15 part of 3.5-bis-ethylamino-pyrazine-2.6-dicarboxylic acid ethylamide instead of the pyrazine named, also has a very beautiful white appearance.

A beautiful brightening effect on acetate silk is obtained if, in the washing agent described above, 0.075 part of 3.5-bis-methylamino-pyrazine-2-carboxylic acid phenylamide-6-carboxylic acid ethylamide are used instead of the pyrazine mentioned.

What we claim is:

1. A detergent composition consisting essentially of a water soluble, synthetic, organic anion-active detergent selected from the group consisting of water soluble soaps and synthetic, organic non-soap anion active sulphated detergents, containing 0.001 to 5% by weight, of the composition, of a 3.5-bis-diamino-pyrazine-2.6-dicarboxylic acid diamide of the general formula:

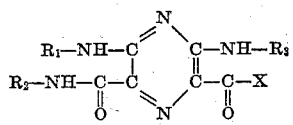

wherein $R_1$, $R_2$ and $R_3$ each represents a member selected from the group consisting of lower alkyl and phenyl substituted methyl radicals and X represents a member selected from the group consisting of primary amino, secondary amino and tertiary amino groups.

2. A detergent composition consisting essentially of a water soluble, synthetic, organic anion active detergent selected from the group consisting of water soluble soaps and synthetic, organic non-soap anion active sulphated detergents, containing 0.001 to 5% by weight, of the composition, of the 3.5-diamino-pyrazine-2.6-dicarboxylic acid diamide of the formula:

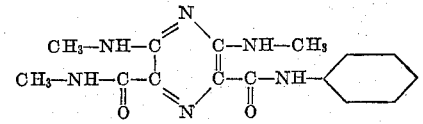

3. A detergent composition consisting essentially of a water soluble, synthetic, organic anion active detergent selected from the group consisting of water soluble soaps and synthetic, organic non-soap anion active sulphated detergents, containing 0.001 to 5% by weight, of the composition, of the 3.5-diamino-pyrazine-2.6-dicarboxylic acid diamide of the formula:

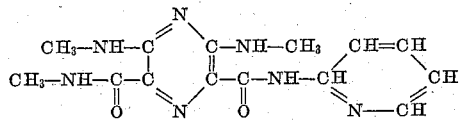

4. A detergent composition consisting essentially of a water soluble, synthetic, organic anion active detergent selected from the group consisting of water soluble soaps and synthetic, organic non-soap anion active sulphated detergents, containing 0.001 to 5% by weight, of the composition, of the 3.5-diamino-pyrazine-2.6-dicarboxylic acid diamide of the formula:

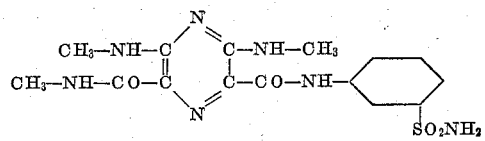

5. A detergent composition consisting essentially of a water soluble, synthetic, organic anion active detergent selected from the group consisting of water soluble soaps and synthetic, organic non-soap anion active sulphated detergents, containing 0.001 to 5% by weight, of the composition, of the 3.5-diamino-pyrazine-2.6-dicarboxylic acid diamide of the formula:

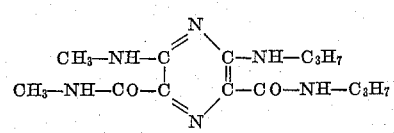

6. A detergent composition consisting essentially of a water soluble, synthetic, organic anion active detergent selected from the group consisting of water soluble soaps and synthetic, organic non-soap anion active sulphated detergents, containing 0.001 to 5% by weight, of the composition, of the 3.5-diamino-pyrazine-2.6-dicarboxylic acid diamide of the formula:

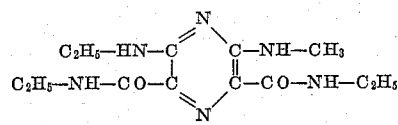

7. A detergent composition consisting essentially of a water soluble, synthetic, organic anion active detergent selected from the group consisting of water soluble soaps and synthetic, organic non-soap anion active sulphated detergents, containing 0.001 to 5% by weight, of the composition, of the 3.5-diamino-pyrazine-2.6-dicarboxylic acid diamide of the formula:

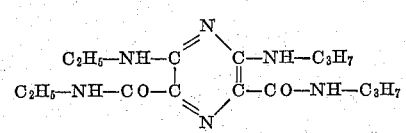

8. A detergent composition consisting essentially of a water soluble, synthetic, organic anion active detergent selected from the group consisting of water soluble soaps and synthetic, organic non-soap anion active sulphated detergents, containing 0.001 to 5% by weight, of the composition, of the 3.5-diamino-pyrazine-2.6-dicarboxylic acid diamide of the formula:

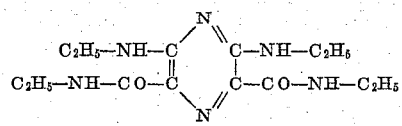

9. A detergent composition consisting essentially of a water soluble, synthetic, organic anion active detergent selected from the group consisting of water soluble soaps and synthetic, organic non-soap anion active sulphated detergents, containing 0.001 to 5% by weight, of the composition, of the 3.5-diamino-pyrazine-2.6-dicarboxylic acid diamide of the formula:

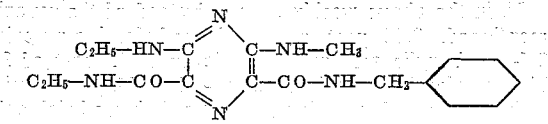

References Cited in the file of this patent

UNITED STATES PATENTS

| | | |
|---|---|---|
| 2,581,889 | Timmis | Jan. 8, 1952 |
| 2,632,009 | Safir | Mar. 17, 1953 |
| 2,805,223 | Hultquist | Sept. 3, 1957 |
| 2,805,999 | Ackermann | Sept. 10, 1957 |
| 2,842,501 | Freyermuth et al. | July 8, 1958 |

OTHER REFERENCES

Raybin: "Chemical Abstracts," vol. 39 (1945), 4433³.

Taylor: "Chemical Abstracts," vol. 49 (1955), 6966h and 6967e.